UNITED STATES PATENT OFFICE.

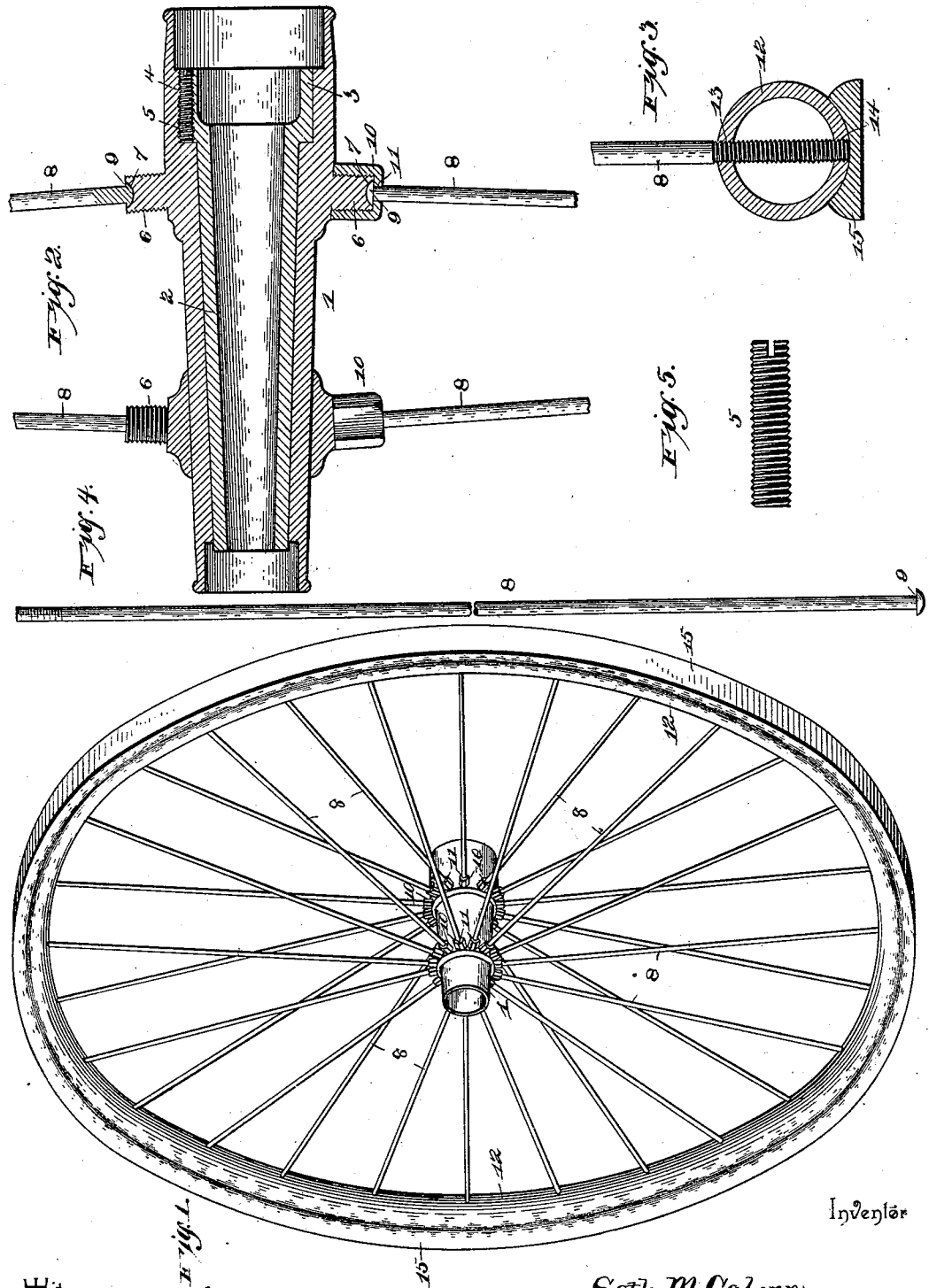

SETH M. CABORN, OF CABORN, INDIANA.

VEHICLE-WHEEL.

SPECIFICATION forming part of Letters Patent No. 552,233, dated December 31, 1895.

Application filed February 23, 1895. Serial No. 539,393. (No model.)

*To all whom it may concern:*

Be it known that I, SETH M. CABORN, a citizen of the United States, residing at Caborn, in the county of Posey and State of Indiana, have invented a new and useful Vehicle-Wheel, of which the following is a specification.

My invention relates to an improvement in vehicle-wheels, and is especially designed for use in the construction of wagon-wheels where extraordinary strength is required.

The object of my invention is to make a vehicle-wheel which shall be simple in construction, possess great durability, and which may be quickly put together or taken apart.

My invention consists in making the wheel felly or rim from a piece of steel tubing and in providing the same with a steel tire flat upon its outer face and internally grooved or concaved to fit such felly snugly; in screw-threading the outer ends of the spokes, also of steel, and passing them entirely through the tubular felly; in butt-ending or heading the inner ends of the spokes and inserting them into recessed threaded extensions or bosses on the wheel-hub and securing said spokes therein by means of internally-threaded screw-caps, and in certain features and details of construction and arrangement of parts hereinafter described and claimed.

In the accompanying drawings, Figure 1 is a perspective view of a vehicle-wheel containing my improvements. Fig. 2 is a longitudinal section through the wheel-hub, showing the manner of securing the butt-ended spokes thereto. Fig. 3 is a transverse section through the tubular felly or rim and tire, also showing my improved method of securing the spokes to the same. Fig. 4 is a detached view of one of the spokes; Fig. 5, a similar view of the threaded key for securing the axle-box within the hub.

Similar numerals of reference indicate corresponding parts in the drawings.

1 represents the hub of a vehicle-wheel made in the form of a hollow metallic casing and adapted to receive the axle-box 2, which may be of any usual or preferred construction adapted to fit snugly within the hub. At its inner end the axle-box is increased in diameter, as shown at 3, and a threaded hole 4 is formed between the outer face of said enlarged end of the axle-box and the corresponding inner face of the hub 1, said perforation extending approximately one half into the axle-box and the other half into the hub. A screw or threaded pin 5 is screwed into the hole 4, thereby engaging both the hub and axle-box and holding the same firmly together. Upon its outer face the hub 1 is provided with a series of radially-projecting threaded bosses 6, which are each provided with a hemispherical concavity or recess in its outer face or end.

8 indicates a metallic spoke having formed at its inner end a hemispherical head 9 corresponding to and adapted to lie in the concavity 7 in the threaded boss 6.

10 indicates an internally-threaded cap or nut provided with a central perforation 11 of the size corresponding to the gage of the spoke 8 and forming an annular shoulder adapted to engage the head of the spoke and secure the same to the hub of the wheel, so as to permit the rotation of said spoke and at the same time hold the spoke otherwise rigid.

12 indicates the rim or felly of my improved wheel, the same consisting of a hollow tube of steel or other suitable metal, as shown in Fig. 3. The outer ends of the spokes 8 are screw-threaded into and pass entirely through threaded perforations 13 and 14 in the inner and outer faces of said tubular rim.

15 indicates a steel rim which is preferably made flat on its outer surface and formed with an internal groove or annular recess corresponding to the shape of the tubular rim, adapting the tire to be applied to and removed from the rim when desired.

By passing the outer threaded ends of the spokes 8 entirely through the tubular rim, as described above, great strength is imparted to the wheel. By means of the method above described of securing the inner headed ends of the spokes to the hub of the wheel, the spokes are adapted to be turned by a suitable spoke-grip for screwing the outer ends thereof into and through the tubular rim.

Parts of the wheel, not herein particularly described, may be constructed in any usual or preferred manner.

Having thus described my invention, what I claim is—

1. In a vehicle wheel, a tubular metallic rim or felly, provided with radially aligning threaded perforations, and a flat metallic tire applied to the periphery thereof, in combination with a suitable hub, and spokes having their inner ends headed and coupled loosely to said hub and having their outer ends threaded and screwed into the threaded perforations in said rim or felly and entirely through the same and against or in close proximity to the inner face of the tire, substantially as and for the purpose described.

2. In a vehicle wheel, a hub provided with radial bosses formed with hemispherical sockets and externally screw-threaded, in combination with a corresponding series of spokes having hemispherical heads fitting said sockets and having their flat sides flush with the ends of the bosses, and a corresponding series of polygonal screw-caps formed with wrench-engaging surfaces and provided with flat annular shoulders for engaging the spoke heads and permitting rotation thereof, while forming a connection which is otherwise rigid, substantially as described.

In testimony that I claim the foregoing as my own I have hereto affixed my signature in the presence of two witnesses.

SETH M. CABORN.

Witnesses:
ANDREW G. DUNN,
G. W. SARLLS.